United States Patent
Kim et al.

(10) Patent No.: US 9,710,630 B2
(45) Date of Patent: Jul. 18, 2017

(54) ELECTRONIC DEVICE AND METHOD OF PROVIDING SECURITY USING COMPLEX BIOMETRIC INFORMATION

(71) Applicant: Samsung Electronics Co., Ltd., Suwon-si, Gyeonggi-do (KR)

(72) Inventors: Min-Chul Kim, Daegu (KR); Sang-Heon Kim, Gumi-si (KR); Hyo-Jin Son, Daegu (KR); Tae-Hwan Wi, Suwon-si (KR); Eun-Yeung Lee, Chilgok-gun (KR); Hae-Dong Lee, Daegu (KR); Yeon-Wook Lim, Daegu (KR); Yong-Gil Han, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/504,858

(22) Filed: Oct. 2, 2014

(65) Prior Publication Data

US 2015/0116086 A1    Apr. 30, 2015

(30) Foreign Application Priority Data

Oct. 30, 2013  (KR) ........................ 10-2013-0130254

(51) Int. Cl.
*G07C 9/00* (2006.01)
*G06F 21/32* (2013.01)
*G06K 9/00* (2006.01)

(52) U.S. Cl.
CPC ......... *G06F 21/32* (2013.01); *G06K 9/00026* (2013.01); *G06K 9/00892* (2013.01)

(58) Field of Classification Search
CPC ........ G07C 9/00; G07C 9/00158; G06F 3/044
USPC ................................................. 340/5.81–5.86
See application file for complete search history.

(56) References Cited

U.S. PATENT DOCUMENTS

| | | | |
|---|---|---|---|
| 6,160,903 A * | 12/2000 | Hamid ............... | G07C 9/00158 382/115 |
| 6,970,582 B2 | 11/2005 | Langley | |
| 7,890,055 B1 * | 2/2011 | Stein .................... | H04B 5/0012 340/573.1 |
| 8,374,402 B2 | 2/2013 | Black | |
| 8,539,790 B1 * | 9/2013 | Budd ................... | A01N 1/0252 62/457.9 |
| 8,769,090 B2 * | 7/2014 | Tardelli ................ | H04L 67/322 707/784 |
| 9,207,715 B2 * | 12/2015 | Filipovic .............. | G06F 1/1633 |

(Continued)

FOREIGN PATENT DOCUMENTS

| JP | 10-162144 A | 6/1998 |
|---|---|---|
| KR | 10-0267262 B1 | 7/2000 |

*Primary Examiner* — Allen T Cao
(74) *Attorney, Agent, or Firm* — Jefferson IP Law, LLP

(57) ABSTRACT

An electronic device and a method that may provide security using complex biometric information are provided. The electronic device includes a sensor module configured to sense two or more pieces of biometric information and a controller configured to execute a command corresponding to biometric combination information when the biometric combination information corresponding to the two or more pieces of biometric information sensed through the sensor module exist. As described above, through use of the complex biometric information combined of two or more pieces of biometric information, more strengthened security may be provided to various objects in the electronic device.

20 Claims, 17 Drawing Sheets

(56) References Cited

U.S. PATENT DOCUMENTS

| | | | |
|---|---|---|---|
| 2002/0024419 A1* | 2/2002 | Dunn | G06F 21/32 340/5.52 |
| 2004/0133787 A1* | 7/2004 | Doughty | G06Q 20/327 713/186 |
| 2004/0239648 A1* | 12/2004 | Abdallah | G06F 21/32 345/173 |
| 2005/0001711 A1* | 1/2005 | Doughty | G06Q 20/327 340/5.74 |
| 2005/0168874 A1* | 8/2005 | Biskeborn | G11B 5/584 360/241.1 |
| 2006/0161789 A1* | 7/2006 | Doughty | G06Q 20/327 713/186 |
| 2006/0291657 A1* | 12/2006 | Benson | G05B 13/0275 380/270 |
| 2007/0255464 A1* | 11/2007 | Singh | B60R 25/102 701/36 |
| 2009/0203355 A1* | 8/2009 | Clark | G06F 21/32 455/411 |
| 2010/0207727 A1* | 8/2010 | Kanekiyo | G06F 17/30247 340/5.82 |
| 2010/0225607 A1 | 9/2010 | Kim | |
| 2011/0227693 A1* | 9/2011 | Ekus | G07C 9/00111 340/3.1 |
| 2012/0105324 A1* | 5/2012 | Lee | G06F 3/005 345/157 |
| 2012/0242635 A1* | 9/2012 | Erhart | G06F 21/32 345/207 |
| 2013/0176108 A1* | 7/2013 | Madhani | G06F 21/32 340/5.82 |
| 2014/0002237 A1* | 1/2014 | Infante | B60R 25/252 340/5.32 |
| 2014/0087788 A1* | 3/2014 | Filipovic | H04B 1/3888 455/557 |
| 2014/0152422 A1* | 6/2014 | Breed | G06K 9/00369 340/5.52 |
| 2015/0363586 A1* | 12/2015 | Klevan | G06F 21/32 726/19 |

* cited by examiner

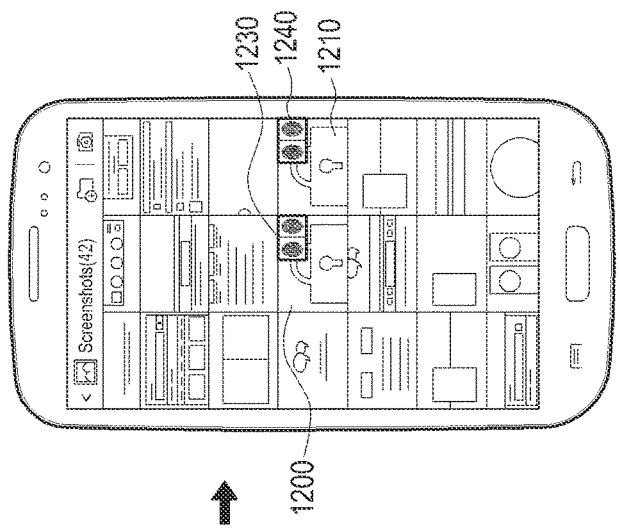
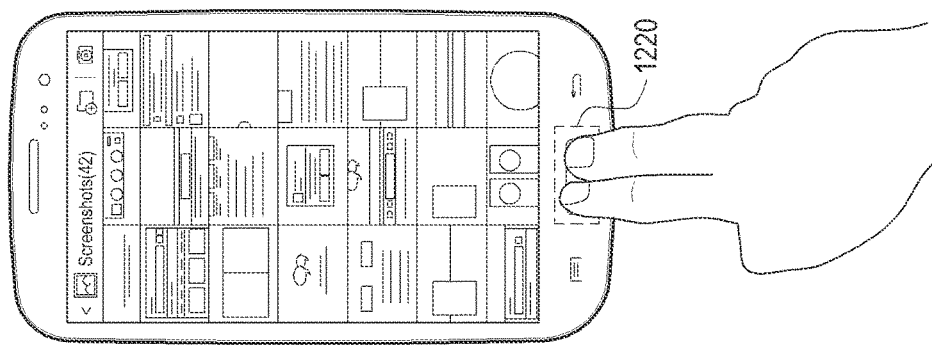
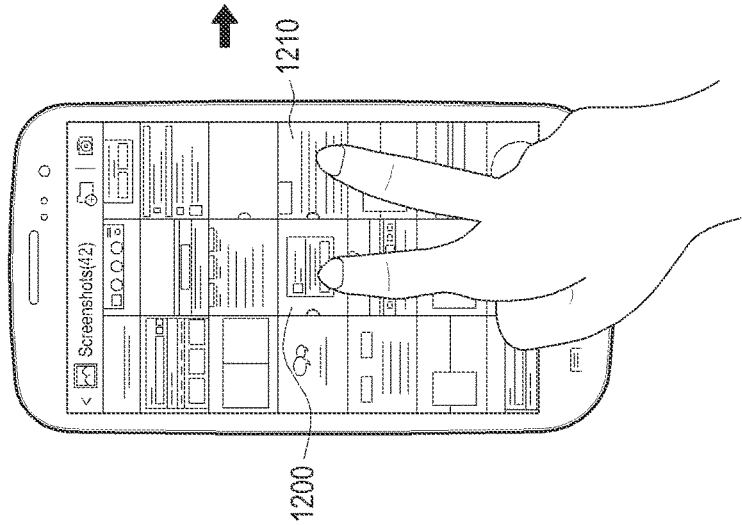
FIG.12C
FIG.12B
FIG.12A

ELECTRONIC DEVICE AND METHOD OF PROVIDING SECURITY USING COMPLEX BIOMETRIC INFORMATION

CROSS-REFERENCE TO RELATED APPLICATION(S)

This application claims the benefit under 35 U.S.C. §119 (a) of a Korean patent application filed on Oct. 30, 2013 in the Korean Intellectual Property Office and assigned Serial number 10-2013-0130254, the entire disclosure of which is hereby incorporated by reference.

TECHNICAL FIELD

The present disclosure relates to an electronic device and method that provides security using complex biometric information.

BACKGROUND

Currently, electronic devices have been developed to include various functions, for example, capturing of a picture or video, Internet communication, and the like, in addition to a simple call function. As the electronic devices have included various functions, importance associated with personal information security has increases. In particular, personal information security is very important in an electronic device that includes functions that may cause significantly serious damage if they are illegally used. Such functions include, but are not limited to, Internet financial services and the like.

Currently, security methods using biometric information have been used. A security method using biometric information authenticates a user using unique personal biometric information that is distinguishable from biometric information of others and thus, authentication using biometric information significantly increases security of the electronic devices. A representative example of the security method using biometric information includes a security method using a fingerprint. Each individuals fingerprint is unique. Which is why, fingerprints were among the first biometric items that were adopted for use in a security system. The security method using a fingerprint has been popularly utilized since a fingerprint recognizing device has developed a high recognition rate that a user may easily use.

Accordingly, a security device and method using complex biometric information that may provide security and convenience is desired.

The above information is presented as background information only to assist with an understanding of the present disclosure. No determination has been made, and no assertion is made, as to whether any of the above might be applicable as prior art with regard to the present disclosure.

SUMMARY

Currently, security of an electronic device has been a big issue. Although a few methods that provide a security solution using a fingerprint have been provided, a solution that may provide security together with convenience has not yet been provided.

Aspects of the present disclosure are to address at least the above-mentioned problems and/or disadvantages and to provide at least the advantages described below. Accordingly, an aspect of the present disclosure is to provide a security device and method using complex biometric information that may secure security and convenience.

Another aspect of the present disclosure is to provide a device and method that may control various operations using complex biometric information.

Another aspect of the present disclosure is to provide a device and method that may readily execute user authentication and a function desired by a user through one procedure.

In accordance with another aspect of the present disclosure, an electronic device for providing security using complex biometric information is provided. The electronic device includes a sensor module configured to sense two or more pieces of biometric information and a controller configured to execute a command corresponding to biometric combination information when the biometric combination information corresponding to the two or more pieces of biometric information sensed through the sensor module exist.

In accordance with another aspect of the present disclosure, a method of providing security using complex biometric information is provided. The method includes sensing two or more pieces of biometric information, determining whether biometric combination information corresponding to the sensed two or more pieces of biometric information exist, and executing a command corresponding to the biometric combination information when the biometric combination information exist.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 12A, 12B, and 12C illustrate a screen illustrating an object security operation for a plurality of objects according to an embodiment of the present disclosure;

Throughout the drawings, it should be noted that like reference numbers are used to depict the same or similar elements, features, and structures.

DETAILED DESCRIPTION

Figure 1:
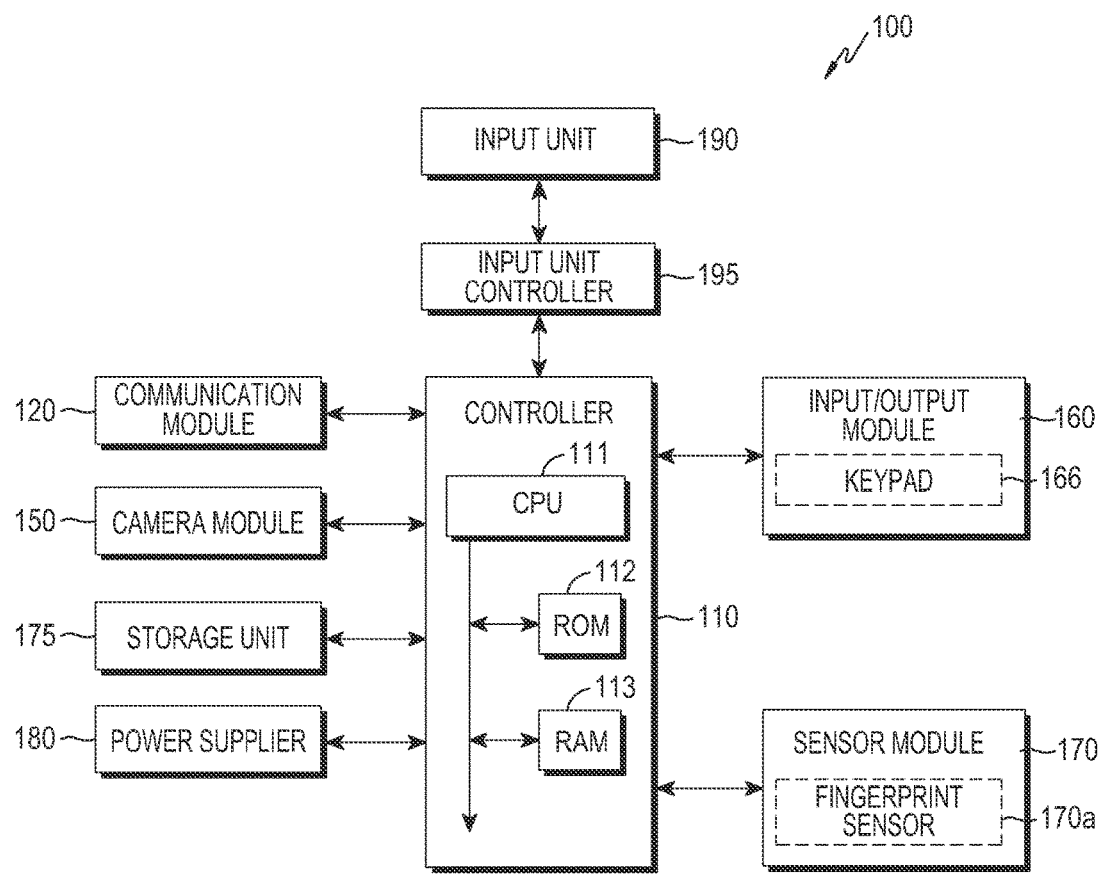
FIG. 1 illustrates a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more of the associated listed items.

The terms used herein are merely used to describe specific embodiments, and are not intended to limit the present disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the embodiments of the present disclosure, an electronic device may be an electronic device that is functionally connected to an input unit. For example, the electronic device may refer to a portable terminal, a mobile terminal, a communication terminal, a portable communication terminal, a portable mobile terminal, and the like. For example, the electronic device may be a smart phone, a portable phone, a game console, a TeleVision (TV), a display device, a head unit for a vehicle, a notebook computer, a laptop computer, a Tablet computer, a Personal Media Player (PMP), a Personal Digital Assistant (PDA), a navigation device, an Automated Teller Machine (ATM) of a bank, a Point-of-Sale (POS) device of a shop or the like. Further, the electronic device according to the present disclosure may be a flexible device or a flexible display device.

A few component elements of the electronic device may be omitted or changed as needed.

FIG. 1 illustrates a configuration of an electronic device according to an embodiment of the present disclosure.

Referring to FIG. 1, an electronic device 100 may include a single input unit 190 (for example, a touch screen) and at least one input unit controller 195. Also, the electronic device 100 may include a controller 110, a communication module 120, a camera module 150, an input/output module 160, a sensor module 170, a storage unit 175, and a power supplier 180.

The controller 110 may include a Central Processing Unit (CPU) 111, a Read-Only Memory (ROM) 112 may store a control program for controlling the electronic device 100, and a Random-Access Memory (RAM) 113 may be used as a storage area for storing a signal or data input from the outside of the electronic device 100 or for work performed in the electronic device 100. The CPU 111 may include multiple cores such as a dual core, a triple core, or a quadruple core, in addition to a single core. The CPU 111, the ROM 112, and the RAM 113 may be mutually connected to each other through an internal bus (not illustrated). The CPU 111 may also be referred to as a processor.

The controller 110 may control the communication module 120, the camera module 150, the input/output module 160, the sensor module 170, the storage unit 175, the power supplier 180, the input unit 190, and the input unit controller 195.

Also, the controller 110 may control various operations in the electronic device 100 using complex biometric information according to an embodiment of the present disclosure. As an example of the operations, the controller 110 executes locking using complex biometric information. For this, the controller 110 may perform a biometric information registration operation, an object locking operation that selects an object and locks the object using a combination of biometric information, a biometric information authentication operation that executes authentication by inputting the registered combination of the biometric information when an object to be unlocked is selected, and a unlocking operation that unlocks the object when authentication succeeds.

Here, the biometric information registration operation may extract feature information from at least one feature extraction area in an obtained biometric image when biometric images of an identical user or different users are obtained through the sensor module 170. The extracted feature information and the corresponding extracting area are matched and stored, and when a combination of extracted feature information is selected, biometric combination information combined of at least two pieces of feature information is generated and stored.

The object locking operation includes an operation of securing an object using a combination of two or more pieces of biometric information and storing the two or more pieces of biometric information when the object to be locked is selected.

The biometric information authentication operation authenticates an input combination of biometric information when the combination of the biometric information is input with respect to a secured object, and displays or executes the secured object when the authentication succeeds.

As described above, the controller 110 may execute a command corresponding to biometric combination information when the biometric combination information corresponding to two or more pieces of biometric information sensed through the sensor module 170 exists.

According to embodiments of the present disclosure, a desired object may be secured using information associated with a combination of biometric information of different users or information associated with a combination of feature information of each feature extraction area of an identical user and thus, more security of increased strength may be provided. Also, the secured object may be readily executed at the same time of authentication through biometric information.

The communication module 120 may include at least one of a mobile communication module, a wireless LAN module, and a short distance communication module.

The camera module 150 may include two or more cameras that capture a still image or a video according to a control of the controller 110.

The input/output module 160 may include at least one of a plurality of buttons, a microphone, a speaker, and a connector, in addition to a keypad 166.

The keypad 166 may receive a key input from a user for a control of the electronic device 100. The keypad 166 may include a physical keypad (not illustrated) formed in the electronic device 100 or a virtual keypad (not illustrated) displayed on the input unit 190. The physical keypad formed in the electronic device 100 may be excluded according to a capability or a structure of the electronic device 100.

The sensor module 170 may include at least one sensor that detects a state of the electronic device 100 and a circumstance around the electronic device 100. For example, the sensor module 170 may include at least one of a proximity sensor for detecting whether the user approaches the electronic device 100, an illuminance sensor (not illustrated) for detecting an amount of ambient light of the electronic device 100, a motion sensor (not illustrated) for detecting a motion (for example, rotation, acceleration, or vibration of the electronic device 100) of the electronic device 100, a geo-magnetic sensor (not illustrated) for detecting a point of the compass of the electronic device 100 using the Earth's magnetic field, a gravity sensor (not illustrated) for detecting a gravity action direction, an altimeter for measuring an atmospheric pressure to detect an altitude, and a GPS module.

Also, the sensor module 170 may further include a fingerprint sensor 170a. The fingerprint sensor 170a may generate biometric information corresponding to a pattern such as a fingerprint of each finger, a knuckle, wrinkles of a knuckle, wrinkles of a finger and the like, when a finger, a knuckle or the like of a user is in contact with a surface of the sensor. Also, the fingerprint sensor 170a may be provided in a structure of a switch, and may generate pressure sensing data as a user presses the sensor. The fingerprint sensor 170a may output the generated biometric information and/or pressure sensing data to the controller 110. For example, the fingerprint sensor 170a generates an excitation signal, and senses, using a pixel antenna array, a change in a current of a response signal caused by the excitation signal as a finger of a user that is conductive when in contact with a surface of the fingerprint sensor 170a so as to generate biometric information.

As described above, various types of fingerprint sensors such as, an optical type, an electro-optic type, an ultrasonic type, a pressure type, a capacitive type, and the like, may be used for recognizing a fingerprint.

Figure 6A:
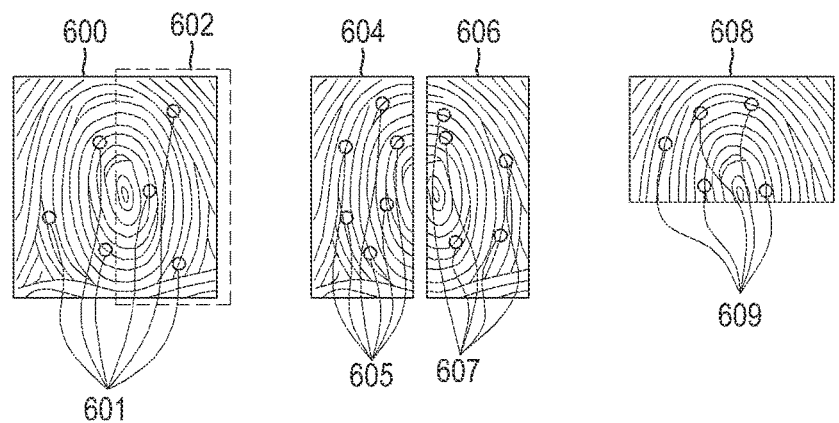
FIGS. 6A, 6B, 7, 8A, and 8B are diagrams illustrating an example of a configuration of complex biometric information according to an embodiment of the present disclosure.

According to an embodiment of the present disclosure, a single fingerprint may be divided into left and/or right sides or top and/or bottom sides for registration. First, when a fingerprint is scanned as illustrated in FIG. 6A, a plurality of feature points 601 may be extracted from the scanned fingerprint 600. In this example, when only a portion 602 of a fingerprint, as opposed to an entire fingerprint, is scanned, a number of feature points existing in the scanned area 602 is less than a number of feature points needed for fingerprint recognition and thus, the case is regarded to have insufficient reliability and fingerprint recognition may fail.

However, in an embodiment of the present disclosure, the scanned fingerprint 600 may be divided into n areas 604, 606, and 608 such as left and/or right divisions or top and/or bottom divisions. Subsequently, after feature points 605, 607, and 609 are extracted for each area 604, 606, and 608, the feature points 605, 607, and 609 and may be matched with the corresponding areas 604, 606, and 608, and stored. Accordingly, although a portion of a fingerprint is input from the user, feature points of the input portion of the fingerprint and feature points for each area may be compared. Conventionally, a False Reject Rate (FRR) is determined according to a result of comparing only feature points of an input fingerprint and feature points of a registered fingerprint and thus, the FRR has been high according to an angle of inputting a fingerprint. According to an embodiment of the present disclosure, a recognition rate may increase by detecting information that matches feature points of an input fingerprint from among feature information for each area. As described above, according to an embodiment of the present disclosure, by overcoming a limit of the fingerprint sensor 170a from a perspective view of a physical size, the recognition rate may be increased only when a portion of fingerprint is input.

Figure 6B:
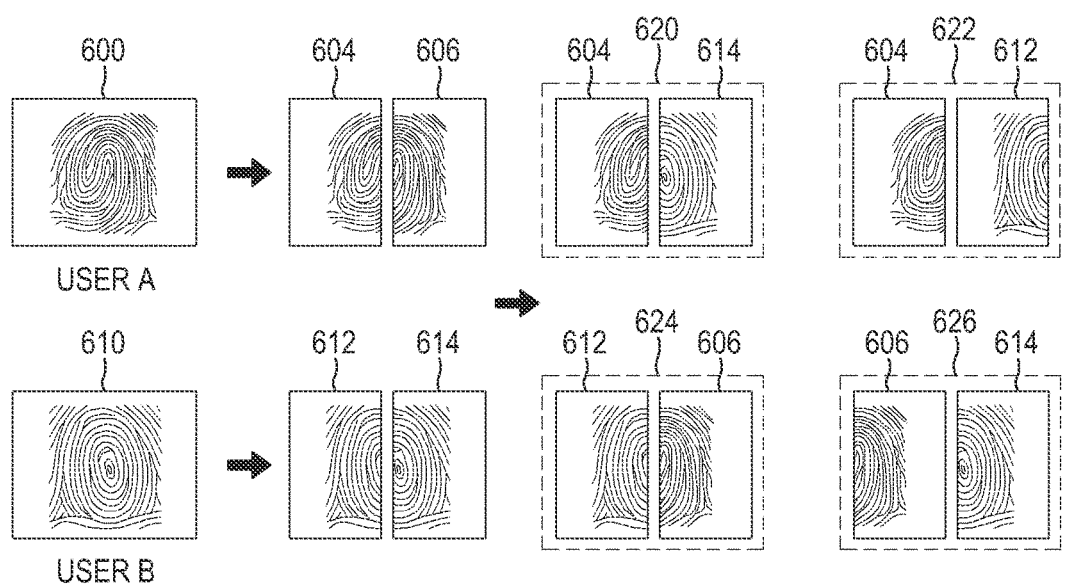

Also, according to another embodiment of the present disclosure, a combination of fingerprints corresponding to divided areas may be registered. For example, as illustrated in FIG. 6B, feature points of partial areas of fingerprints, such as a right side 606 of the fingerprint 600 of a user A and a left side 612 of a fingerprint 610 of a user B, are extracted and the feature points of each area 606 and 612 may be combined and may be registered as single fingerprint data. Also, feature points of partial areas of different fingerprints of the user A may be combined and registered as single fingerprint data.

Also, when fingerprints are registered through the fingerprint sensor 170a, a palm may be put on the input unit 190 and fingerprints are scanned and thus, fingerprints are stored together with a fingerprint corresponding to the palm recognized in the input unit 190. The input unit 190 may recognize an area, a position, and an angle of a shape of a palm that is in contact in the same manner as an existing touch screen, as opposed to a new touch screen that is capable of recognizing a fingerprint and thus, may be an assistive means for security and may be used as a means for strengthening a security level.

Providing that a variety of biometric information is registered through the fingerprint sensor 170a, a user may lock an object using a combination of desired biometric information when the user needs to secure the object with a high security level. For example, by storing palm area information of the user and fingerprints together for the object, the object may be locked. In this case, the controller 110 instructs the user to put a palm into contact with the input unit 190, and unlocks the object by determining that palm area information generated when the user puts the palm into contact with the input unit 190 and palm information and fingerprints stored in advance are identical within an error range.

Also, another example of the biometric information includes finger blood vessel pattern information, biometric bloodstream information, an electrocardiogram, a pulse rate, an oxygen saturation, and the like. In this case, the sensor module 170 may further include an InfraRed (IR) sensor, a piezoelectric sensor, a hall sensor, and the like. In particular, the IR sensor is formed of an IR emitting diode and IR port transistor, and refers to equipment that uses reflective photoplethysmogram that receives, in a phototransistor, a reflected light corresponding to a change in a volume of a blood vessel as IR from a Light Emitting Diode (LED) arrives at a capillary vessel of a fingertip. The hall sensor refers to a magnetic transducer made of Indium Antimonide (Insb), Indium Arsenide (InAs), Germanium (Ge), and Silicon (Si). When the additional sensors as described above are added to a position where the fingerprint sensor 170a is disposed, a physical electric signal is recognized and a signal associated with a change in a magnetic field may be additionally obtained.

Also, the sensor module 170 may further include an electrocardiogram electrode part that is formed of electrodes having different polarities, and is in contact with a body part of a user so as to measure an electrocardiogram signal from among biometric signals. Also, the sensor module 170 may further include an optical sensor that is in contact with a portion of a body of a user, for example, a finger. The sensor module 170 measures a pulse wave signal from among biometric signals. As described above, the sensor module 170 includes various sensors in addition to the fingerprint sensor 170a. The sensor module 170 may simultaneously obtain other biometric information in addition to a fingerprint. The biometric information obtained as described above may be stored in the storage unit 175 together with other biometric information such as a fingerprint and the like, and may be utilized as additional data needed for security.

Accordingly, a more strengthened security method may be provided by using two different types of biometric information, such as recognizing a fingerprint and simultaneously recognizing other biometric information, for example, biometric bloodstream information, and the like. Also, in addition to the biometric information received through the sensor module 170, other biometric information may be combined and used, such as a combination of voice recognition and fingerprint recognition and the like. As described above, the biometric information may provide a strengthened security method when compared to a method of just combining feature points obtained from fingerprint recognition and storing the feature points obtained from the fingerprints.

Accordingly, the controller 110 may recognize a pattern such as a fingerprint of a user, wrinkles of a knuckle, wrinkles of a finger, and the like, according to the biometric information received from the fingerprint sensor 170a, and may execute an application corresponding to each biometric information or a combination thereof.

The storage unit 175 may store a signal or data input/output according to an operation of the communication module 120, the camera module 150, the input/output module 160, the sensor module 170, or the input unit 190, according to a control of the controller 110. The storage unit 175 may store a control program and applications for controlling the electronic device 100 or the controller 110.

The term "storage unit" is used as a term which refers to a data storage device such as the storage unit 175, the ROM 112 or the RAM 113 in the controller 110, or a memory card (for example, an SD card or a memory stick) installed in the electronic device 100. The storage unit 175 may include a non-volatile memory, a volatile memory, or a Hard Disk Drive (HDD) or a Solid State Drive (SSD).

Also, the storage unit 175 may store various applications such as a navigation, video calls, games, time-based alert applications, or the like, images to provide a Graphical User Interface (GUI) related to the applications, databases or data related to user information, documents and methods for processing a touch input, background images (e.g., a menu screen, an idle screen, etc.) or operating programs for operating the electronic device 100, and images captured by the camera module 150 and the like.

Also, the storage unit 175 may map a plurality of pieces of biometric combination information combined of two or more pieces of biometric information input through the sensor module 170 and commands corresponding to the biometric combination information, and may store the same. Also, the storage unit 175 may store a plurality of pieces of biometric combination information combined of two or more pieces of biometric information, for example, a combination of fingerprints of an identical user or two or more different users, wrinkles of a knuckle, wrinkles of a finger, and the like. The command may include any type of command that instructs an application to execute a predetermined function in the electronic device 100. Also, the command may include execution of a predetermined application installed in the electronic device 100, or may include execution of a predetermined function included in an application together with the execution of the application.

The storage unit 175 is a machine (for example, computer)-readable medium, and the term of the machine-readable medium may be defined as a medium for providing data to the machine to perform a specific function. The storage unit 175 may include a non-volatile medium and a volatile medium. All of these media may be tangible such that the commands transferred by the media may be detected by a physical instrument through which the machine reads the commands.

The machine-readable medium includes, although not limited thereto, at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a Flash-EPROM.

The power supplier 180 may supply power to one or a plurality of batteries disposed on the housing of the electronic device 100 according to a control of the controller 110. One or a plurality of batteries may supply power to the electronic device 100. Further, the power supplier 180 may supply, to the electronic device 100, power input from an external power source through a wired cable connected to the connector 165. In addition, the power supplier 180 may supply, to the electronic device 100, power wirelessly input from the external power source through a wireless charging technology.

Also, the electronic device 100 may include at least one input unit 190 providing user graphical interfaces corresponding to various services (for example, a phone call, data transmission, broadcasting, and capturing of an image) to the user.

The input unit 190 may be configured to include a display panel that displays output information output from the electronic device 100, and an input panel that inputs various inputs by a user. The display panel may include a Liquid Crystal Display (LCD), an Active Matrix Organic Light Emitting Diode (AMOLED), and the like. The display panel may display various screens associated with various operation states of the electronic device 100, execution of an application, a service, and the like, and may display an object for which locking is set according to an embodiment of the present disclosure.

The input panel is configured to include at least one panel that may sense a single or multi-touch input, a drag input, a writing input, a drawing input, and the like provided by a user using various objects such as a finger, a pen, and the like. For example, the input panel may be embodied using a single panel that may sense both a finger input and a pen input, and may be embodied using two panels such as a touch recognition module that may sense a finger input and a pen recognition module that may sense a pen input.

The input unit 190 may output, to the input unit controller 195, a signal corresponding to at least one user input that is input to the user graphic interface. The input unit 190 may receive at least one user input through a portion of a user's body (for example, a finger including a thumb). The input unit 190 may receive successive motions of a single touch. The input unit 190 may output, to the input unit controller 195, an analog signal corresponding to the successive motions of the input touch.

In various embodiments of the present disclosure, the touch may not be limited to a contact between the input unit 190 and a user input means such as a finger or the like, and may include a non-contact (for example, a case in which a user input means is placed within a recognizable distance (for example, 1 cm) in which the user input means may be detected without being in contact with the input unit 190). A distance or interval within which the user input means may be recognized by the input unit 190 may be changed according to a capacity or structure of the electronic device 100. Particularly, the input unit 190 may be configured to output different values (for example, including a voltage value or a current value as an analog value) for the detected values by a direct touch event and an indirect touch event (that is, a hovering event) so that the direct touch event by a contact with the user input means and the indirect touch event may be distinguishably detected.

The input unit 190 may be embodied as varied types, for example, a resistive type, a capacitive type, an infrared type, an acoustic wave type, or a combination thereof.

The input unit controller 195 converts a signal input from the input unit 190 into a digital signal and transmits the digital signal to the controller 110. The controller 110 may control a user interface displayed on the input unit 190 using a digital signal received from the input unit controller 195. For example, the controller 110 allows a short-cut icon (not illustrated) or an object displayed on the input unit 190 to be selected or executed in response to the direct touch event or the hovering event. Also, the input unit controller 195 may be integrated into the controller 110.

The input unit controller 195 may determine a position of a user input and a hovering interval or distance by detecting a value (for example, a current value, and the like) output through the input unit 190, may convert the determined distance value into a digital signal (for example, Z coordinates), and may provide the digital signal to the controller 110. In addition, the controller 110 may detect various user inputs received through the camera module 150, the input/output module 160, and the sensor module 170, in addition to the input unit 190. The user input may include various types of information that may be input into the device 100 such as a gesture of a user, a voice, a movement of a pupil, a biometric signal, and the like, in addition to the touch. The controller 110 may control a predetermined operation or function corresponding to the detected user input to be performed.

Also, each functional unit and module in embodiments of the present disclosure may indicate a functional or structural coupling of hardware for executing a technical idea of embodiments of the present disclosure and software for operating the hardware. For example, each functional unit may refer to a logical unit of a predetermined code or a hardware resource for executing the predetermine code, and it may be easily inferred by those skilled in the art that the functional unit does not necessarily refer to a physically connected code or one type of hardware.

Figure 2:
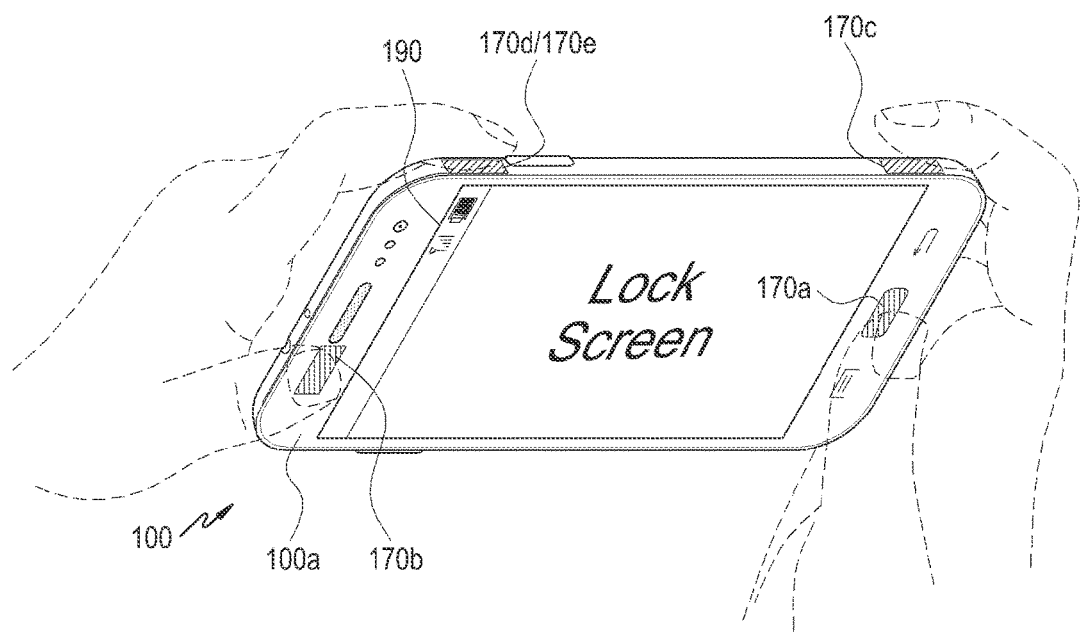
FIG. 2 illustrates a front side perspective view of an electronic device according to an embodiment of the present disclosure.

FIG. 2 illustrates a front side perspective view of an electronic device according to an embodiment of the present disclosure.

Referring to FIG. 2, the input unit 190 and the fingerprint sensor 170a are disposed on the center of the front side 100a of the electronic device 100. The fingerprint sensor 170a may be configured to execute a fingerprint recognition function, a home button function that is generally preloaded in the electronic device 100, and a direction key function. Also, a separate home button may be further disposed on a top, bottom, or lateral side of the fingerprint sensor 170a. The fingerprint sensor 170a may be disposed on the back side, the lateral side, or the left or right side of the front side of the electronic device 100, and the disposition is not limited to the front side.

Also, in addition to the fingerprint sensor 170a, electrocardiogram electrodes 170b, 170c, and 170d and an optical sensor 170e may be disposed on the electronic device 100, to measure biometric bloodstream information of a user, an electrocardiogram signal, a pulse wave signal, and the like. Although FIG. 2 illustrates a case in which the plurality of electrocardiogram electrodes 170b, 170c, and 170d and the optical sensor 170e are disposed on the front side of the electronic device 100, the disposition of the electrocardiogram electrodes and the optical sensor may be changed according to how a user holds the electronic device 100. For example, it is preferable that the electrocardiogram electrodes are disposed on positions where a user is capable of putting at least three fingers in contact with the electrodes.

FIG. 2 also illustrates an example where a lock screen is displayed on the input unit 190. The lock screen is a first screen displayed on the input unit 190 when the electronic device 100 is powered on, and may be a screen that provides an environment that enables access to the electronic device 100 when security information (for example, biometric combination information, a password, a security pattern, and the like) set by a user is input. Therefore, the controller 110 determines a validity of security information (for example, biometric combination information, a password, a security pattern, and the like) determined by a user input through the fingerprint sensor 170*a*, and proceeds with unlocking the lock screen so as to switch the lock screen into a home screen.

Figure 3:
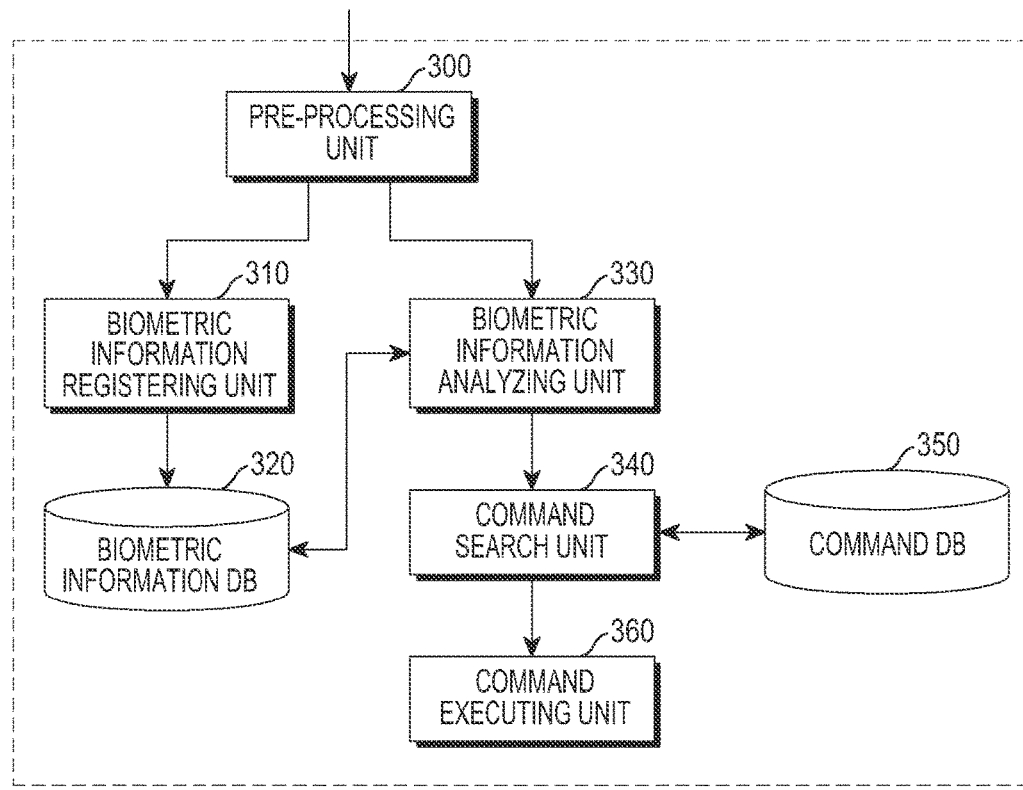
FIG. 3 is a block diagram illustrating a device for executing a function related to inputting complex biometric information according to an embodiment of the present disclosure.

FIG. 3 is a block diagram illustrating a device for executing a function related to inputting complex biometric information according to an embodiment of the present disclosure.

Referring to FIG. 3, the device may be configured to include a pre-processing unit 300, a biometric information registering unit 310, a biometric information DB 320, a biometric information analyzing unit 330, a command search unit 340, a command DB 350, and a command executing unit 360.

The pre-processing unit 300 may execute a pre-processing operation to divide, rotate, resize, and the like when a biometric image, such as a finger of a user and the like, that is in contact with the fingerprint sensor 170*a* or the input unit 190 is input.

The biometric information registering unit 310 executes an operation for registering a plurality of pieces of biometric information associated with an identical user or different users, and may store feature values of property information utilized for authentication of biometric information in the biometric information DB 320. The biometric information registering unit 310 may instruct a user to input biometric information such as a fingerprint and the like. For this, a window for instructing registration of biometric information may be displayed on the input unit 190, and a predetermined marker such as a shape of a hand or the like may be displayed on the input unit 190 so that the user may be instructed to put a hand into contact with the surface along the shape of the hand. In this example, by displaying a registration valid time on the input unit 190, the user may be encouraged to register the biometric information.

Also, a menu that enables selection of a fingerprint, a knuckle, wrinkles of a knuckle, wrinkles of a finger to be registered through selecting or cancelling a check box may be displayed on the window for instructing the registration of biometric information and thus, a combination of desired biometric information may be selected. For example, when providing an instruction to input a fingerprint divided into n pieces, a screen for instructing putting a thumb and an index finger together and swiping may be displayed. Also, when providing an instruction to input a combination of a fingerprint, a knuckle, wrinkles of a knuckle, wrinkles of a finger, and the like, a screen for instructing putting the fingertip of an index finger and a knuckle of a middle finger together and swiping may be displayed.

The biometric information DB 320 may store a plurality of pieces of biometric information associated with the identical user or different users. For example, in addition to the information associated with a fingerprint of each finger, a knuckle, wrinkles of a knuckle, wrinkles of a finger, and the like, biometric combination information combined thereof may be stored. In addition, finger blood vessel pattern information, biometric bloodstream information and the like may be stored.

The biometric information analyzing unit 330 may analyze an input biometric image. For example, biometric information corresponding to the biometric image may be identified by analyzing feature values of the biometric image.

The command search unit 340 searches a mapping table stored in the command DB 350 for a command corresponding to the biometric information identified by the biometric information analyzing unit 330. The command may include any type of command that instructs an application to execute a predetermined function in the electronic device 100. Also, the command may include execution of a predetermined application installed in the electronic device 100, or may include execution of a predetermined function included in an application together with the execution of the application.

The command DB 350 may store a command corresponding to each piece of biometric information or information combined of two or more pieces of biometric information. For example, a command for executing a phone application may be mapped to an index finger fingerprint information, and a command for executing an SNS application may be mapped to index finger knuckle information. When both a fingerprint and a knuckle are simultaneously recognized, commands corresponding to each may be simultaneously executed. Accordingly, a plurality of applications may be simultaneously executed, and an application execution screen may be output in a multi-window form.

Also, a command for executing a function may be mapped to a combination of index fingerprint information and middle finger knuckle information. As an example, various functions executable in the electronic device 100 may be mapped to a command such as commanding execution of locking, commanding transferring of a file to a folder designated by a user, commanding transferring to a server, and the like. Also, in addition to a combination of fingerprint information of fingers, biometric combination information combined of a partial piece of fingerprint information of a first user and a partial piece of fingerprint information of a second user may be mapped to a command for executing locking with the biometric combination information.

The command executing unit 360 executes a command retrieved by the command search unit 340. In this example, the command executing unit 360 may display a screen corresponding to the execution of the command when authentication of biometric information through the biometric information analyzing unit 330 succeeds.

Meanwhile, component elements in FIG. 3 are separately illustrated to indicate that they may be functionally and logically separated from each other, but the component elements do not have to be separate components or implemented as separate codes.

Figure 4:
FIG. 4 is a diagram of a network that authenticates complex biometric information according to an embodiment of the present disclosure.

Also, although it has been described that an operation of storing registered biometric information and an operation of authenticating input biometric information by comparing them with the stored biometric information are performed in the electronic device 100, the operations may be embodied to be executed in a biometric information authentication server 410 as illustrated in FIG. 4.

FIG. 4 is a diagram of a network that authenticates complex biometric information according to an embodiment of the present disclosure.

Referring to FIG. 4, the electronic device 100 may hash input biometric information and transmit the hashed biometric information to the biometric information authentication server 410, through a communication network 400, to increase a recognition rate through authentication of complex biometric information.

The communication network 400 may be configured irrespective of an aspect of communication such as wired and/or wireless communication, and may be configured as various communication networks including a Personal Area Network (PAN), a Local Area Network (LAN), a Metropolitan Area Network (MAN), a Wide Area Network (WAN) and the like. Further, the communication network 400 may be a known World Wide Web (WWW), and may use a wireless transmission technology utilized for a short distance communication such as InfraRed Data Association (IrDA) or Bluetooth. Also, the communication network 400 may include a cable broadcasting communication network, a terrestrial broadcasting communication network, a satellite broadcasting communication network, and the like that may be used for the electronic device 100 such as a smart TV to receive a broadcasting signal.

The biometric information authentication server 410 hashes and stores biometric information transferred from the electronic device 100 to prevent leakage of the biometric information such as a fingerprint of a user and the like, and executes authentication by comparing biometric information received for authentication and previously stored biometric information.

The biometric information authentication server 410 may be applied to implementation of various services. For example, when the biometric information authentication server 410 is embodied to perform as a payment authentication server in an electronic payment system, the biometric information authentication server 410 may request the electronic device 100 to instruct the user to input a predetermined biometric information, for example, the left index fingerprint and the second knuckle of the left ring finger. In response to this, when the electronic device 100 transmits corresponding biometric information to the biometric information authentication server 410 and receives a result indicating that authentication succeeds, the biometric information authentication server 410 may enable a payment service to be executed. As described above, biometric information may be stored in the external biometric information authentication server 410 for authentication and thus, a user may use a service that requires a high security level such as financial services and may use a desired content, function, and the like using another electronic device since a user's own biometric information is used.

Figure 5:
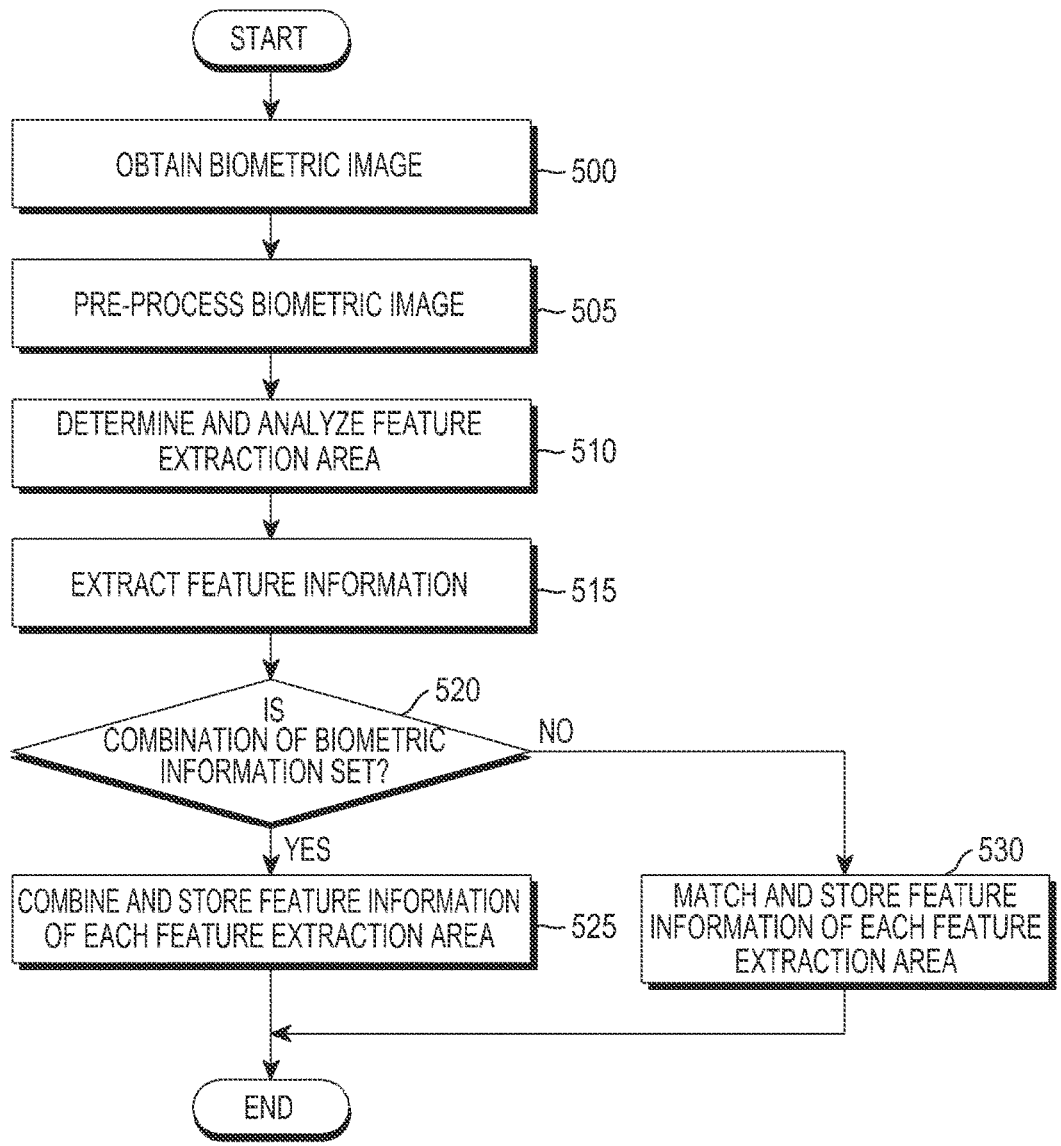
FIG. 5 is a flowchart illustrating an operation of registering biometric information in an electronic device according to an embodiment of the present disclosure.

FIG. 5 is a flowchart illustrating an operation of registering biometric information in an electronic device according to an embodiment of the present disclosure. Hereinafter, although descriptions will be provided with reference to FIG. 6A through FIG. 8B, the examples of biometric information may not be limited thereto.

Referring to FIG. 5, the electronic device 100 may obtain a biometric image in operation 500, and pre-process a biometric image in operation 505. Subsequently, the electronic device 100 may determine one or more feature extraction areas from a biometric image, and may perform analysis in operation 510. The electronic device 100 may extract feature information from the feature extraction areas in operation 515. Here, two or more feature extraction areas may exist. For example, in a single finger, the feature extraction area corresponds to a fingerprint area, a knuckle area, and the like. In a single hand, the feature extraction area corresponds to a fingerprint area, knuckle area, wrinkles of a palm, and the like. When a combination of biometric information is set by determining whether the combination of biometric information is set in operation 520, feature information is combined and stored for each feature extraction area in operation 525. Conversely, when the combination of biometric information is not set in operation 520, the electronic device 100 may proceed with operation 530 and matches a feature information feature extraction area and stores the same. As described above, the electronic device 100 may store two or more pieces of feature information for each feature extraction area so that biometric information of various situations may be recognized.

FIGS. 6A, 6B, 7, 8A, and 8B are diagrams illustrating an example of a configuration of complex biometric information according to an embodiment of the present disclosure.

Referring to FIGS. 6A and 6B, when the fingerprint image 600 of a user A is obtained as a biometric image. The fingerprint image 600 is divided into two sections according to a vertical axis and each piece of fingerprint information 604 and 606 may be used for security. In this case, feature points may be extracted from the areas 604 and 606 divided as left and right areas and may be respectively stored as independent fingerprint information. Also, when the fingerprint image 610 of a user B is obtained, fingerprint information 612 and 614 may be stored in the same manner as the above description.

Also, in an embodiment of the present disclosure, biometric combination information combined of two or more pieces of fingerprint information may be stored for strengthening security. That is, as illustrated in FIG. 6B, new fingerprint data 620, 622, 624, and 626 may be generated by combining a partial fingerprint of the user A and a partial fingerprint of the user B, and the fingerprint data may be used for strengthening security. Accordingly, the user maps single fingerprint information of the user or a combination of fingerprint information of the user to a predetermined function, or may map information combined of a fingerprint of the user and a fingerprint of another user to the predetermined function.

In this example, an actual contact area of a fingerprint of an identical finger may be changed according to an intensity of a contact, a direction of an incline of the finger, and the like. Therefore, an embodiment of the present disclosure stores biometric information associated with a case in which a user puts a finger into contact by inclining to the left or right side within 10 degrees from a direction vertical to the surface of the input unit 190. For this, biometric information scanned as a contact with the surface is provided and may be twisted to the left or right in a 3 Dimensional (3D) space to generate new biometric information, and feature points are extracted from the generated biometric information and stored.

As described above, although the user makes contact once for biometric information registration, the electronic device 100 may store a variety of biometric information. Accordingly, when the input biometric information matches one of the various biometric information stored in advance, a command corresponding to the biometric information may be executed. Also, when the user desires to execute a predetermined operation through scanning a fingerprint and only a predetermined portion (for example, the left or right area or the top area) is scanned through incorrect scanning, the scanned portion may be compared with partial areas 604, 606, and 608 stored in advance as illustrated in FIG. 6A. Accordingly, although partial biometric information is input by the user, as opposed to the entire biometric information, authentication may be executed. As described above, a fingerprint area input when biometric information is registered may be expanded, and information associated with the expanded area may also be stored. Therefore, an FRR may be dramatically decreased.

Figure 7:
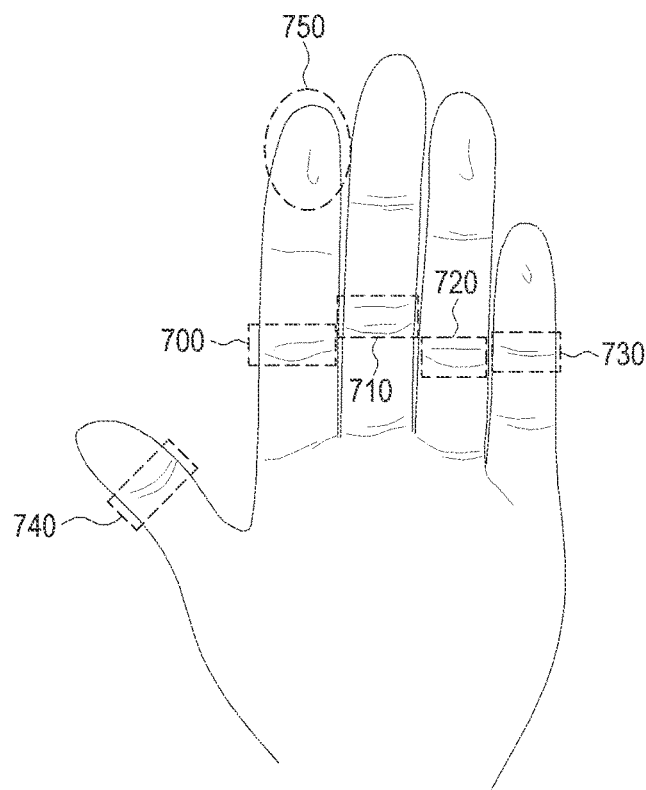

Referring to FIG. 7, together with a fingerprint 750, a knuckle 700, 710, 720, 730, and 740 of each finger of a user may be stored as biometric information. In this example, in addition to the information associated with knuckle of each finger, wrinkles of a knuckle of each finger and the like may be used as biometric information.

Figures 8A, 8B:
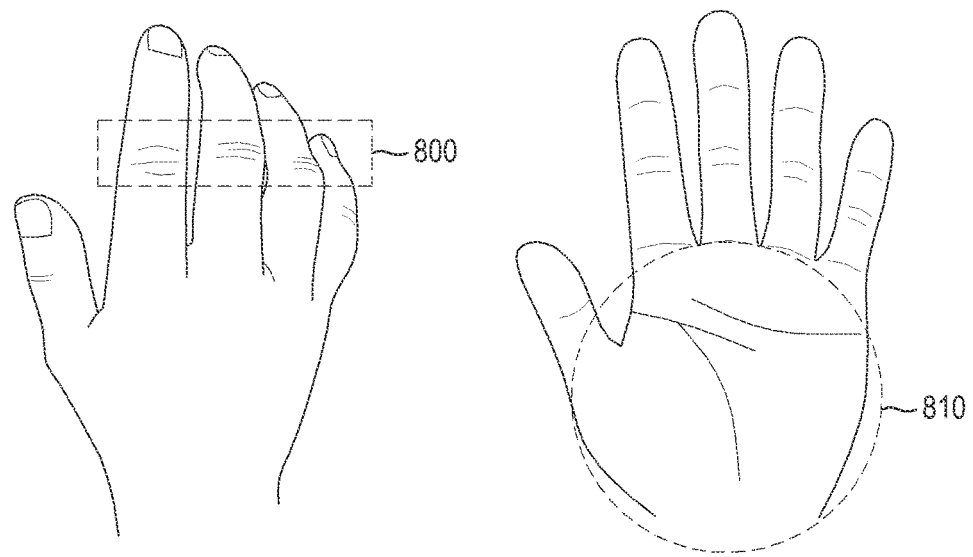

Referring to FIGS. 8A and 8B, wrinkles of a finger 800, wrinkles 810 of a palm or the like may be utilized as biometric information. For example, biometric information as illustrated in FIG. 7 or FIGS. 8A and 8B may be used for a user who loses a fingerprint. As another example, the biometric information of FIG. 7 or FIGS. 8A and 8B may be used for locking an object that requires a low security level since the feature points are less distinguishable when compared to a fingerprint.

As illustrated in FIG. 7, a knuckle of each finger has a common feature. For example, a middle finger has common features of having a horizontal line that is clearer than knuckles of each of the other fingers, and the second knuckle which has fewer horizontal lines than the first knuckle. Therefore, the electronic device 100 enables the user to select a finger to be registered when biometric information is registered, extracts feature points corresponding to a feature of a knuckle registered by the user, sets an error rate of the feature points, and stores the same. Therefore, a finger, a person having the finger, or the like may be identified by analyzing a common feature and feature points of a knuckle.

As described above, other biometric information besides a fingerprint may be utilized as additional information, for example, additional information for authenticating a user through a shape of wrinkles of a knuckle of the user in a case in which false authentication occurs when authentication of the user is performed through a fingerprint. In this case, the user may input a plurality of pieces of biometric information through a single operation of putting an entire finger including a fingerprint into contact, and the electronic device 100 may perform double recognition using the plurality of pieces of biometric information, and may prevent false authentication in advance.

As described above, to increase security, a method of authenticating various authenticable parts such as a finger, a knuckle, a back of a hand, and the like, in addition to a fingerprint may be used.

Figure 9:
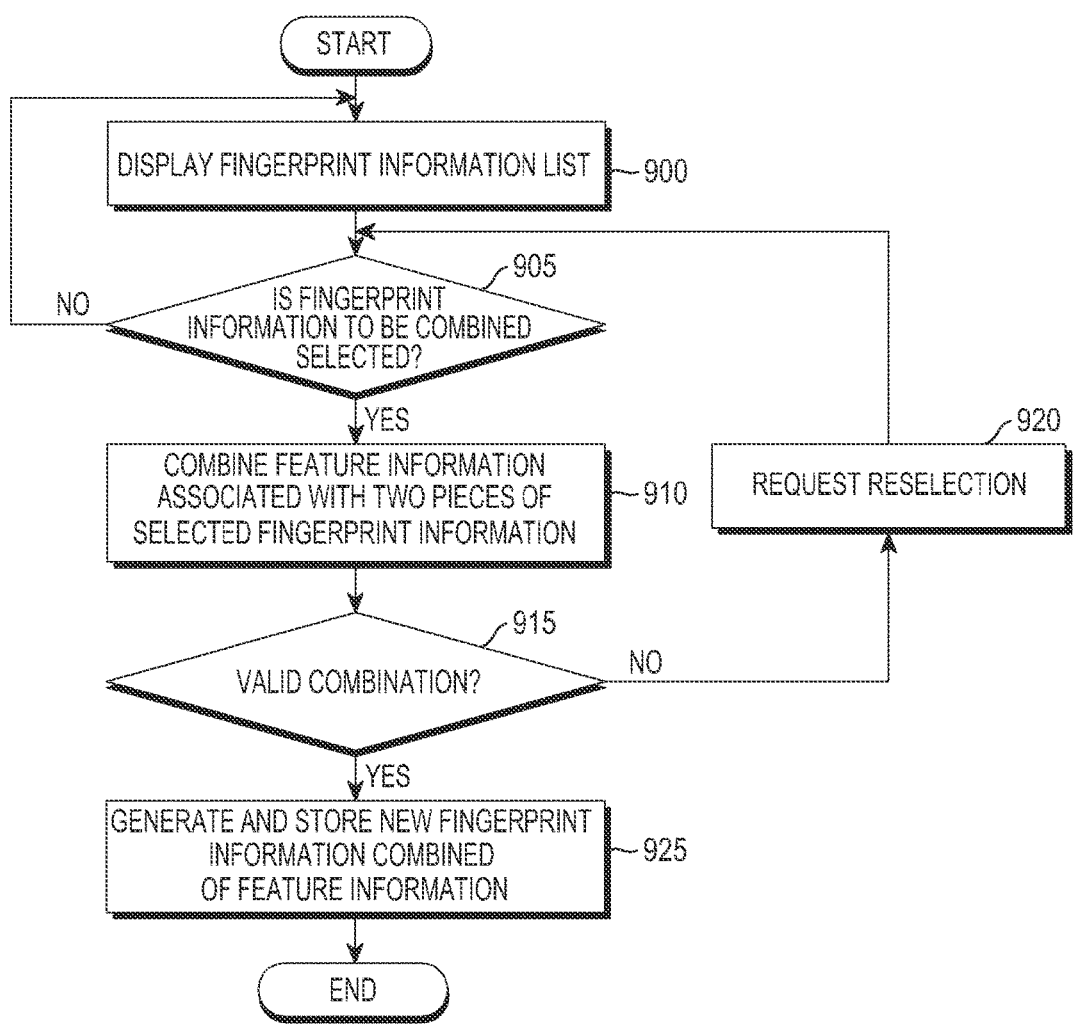
FIG. 9 is a flowchart illustrating an operation of generating complex biometric information according to an embodiment of the present disclosure.

FIG. 9 is a flowchart illustrating an operation of generating biometric information according to an embodiment of the present disclosure. Hereinafter, a case in which biometric information is fingerprint information will be exemplified.

Referring to FIG. 9, the electronic device 100 may display a fingerprint information list stored in the biometric information DB 320 in operation 900. The electronic device 100 may determine whether fingerprint information to be combined is selected in operation 905. When the fingerprint information to be combined is selected, the electronic device 100 may combine feature information of two pieces of selected fingerprint information in operation 910. In operation 905 when the fingerprint information to be combined is not selected, the electronic device 100 may return to operation 900. The electronic device 100 may determine whether the combination is valid is determined in operation 915. When the combination is invalid, reselection is requested in operation 920. In operation 915 when it is determined that the combination is valid, the electronic device 100 may generate and store new fingerprint information corresponding to the combination of the feature point in operation 925. The determination on whether the combination is valid in operation 915 may be changed according to the fingerprint sensor 170a and the type of the electronic device 100. For example, the electronic device 100 including two fingerprint sensors 170a and a device having a single fingerprint sensor 170a may have different criteria for a valid combination, and may use different methods for determining the validity. The method of determining a valid combination may include a method of instructing to input biometric information to be newly generated, repeatedly at least once.

Figure 10:
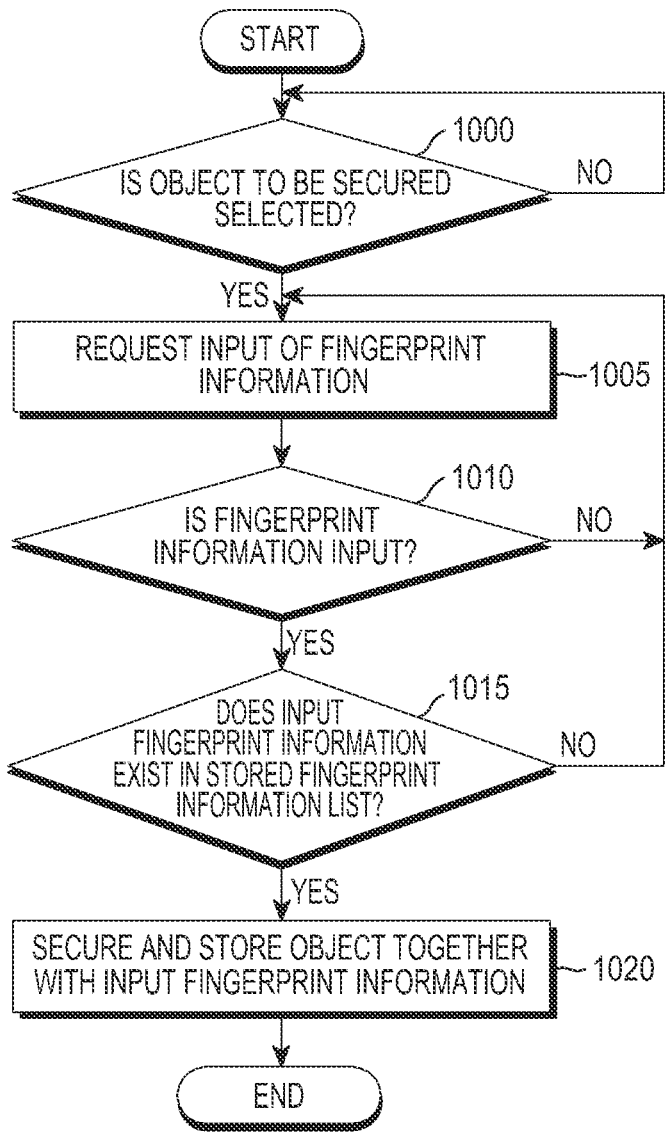
FIG. 10 is a flowchart illustrating an object security operation using fingerprint information according to an embodiment of the present disclosure.

FIG. 10 is a flowchart illustrating an object security operation using fingerprint information according to an embodiment of the present disclosure.

Referring to FIG. 10, the electronic device 100 may request an input of fingerprint information in operation 1005 when an input of a selection on an object to be secured from among objects displayed on the input unit 190 is input in operation 1000.

Figure 11C:
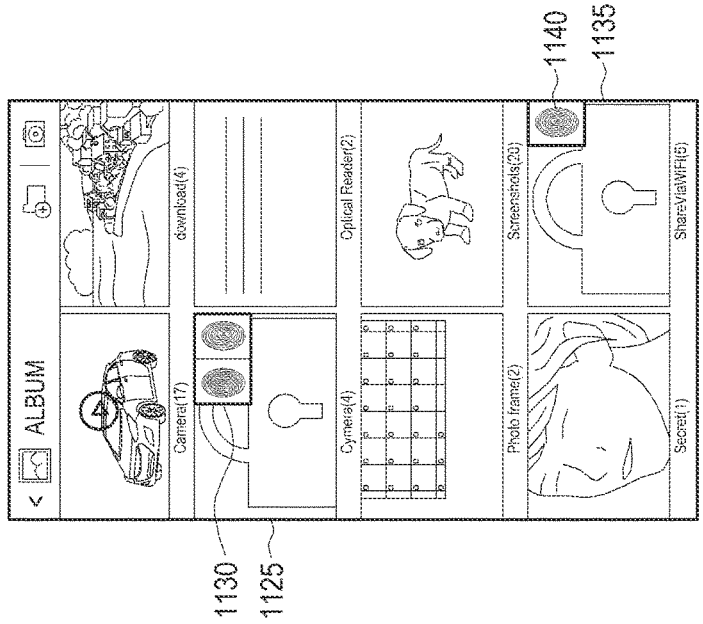
FIGS. 11A, 11B, and 11C illustrate a screen illustrating an object security operation according to an embodiment of the present disclosure.
Figure 11B:
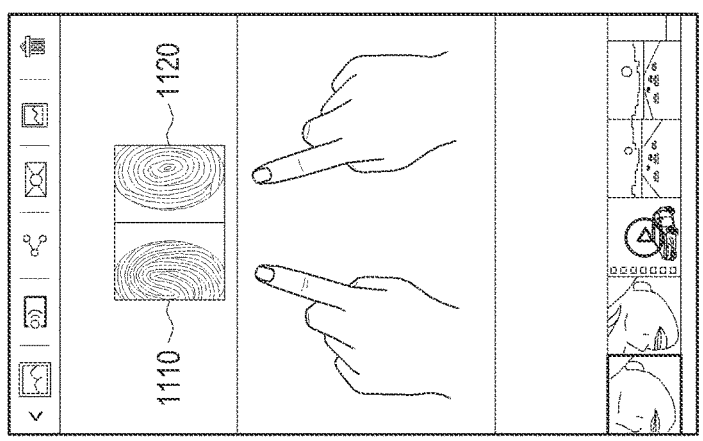
Figure 11A:
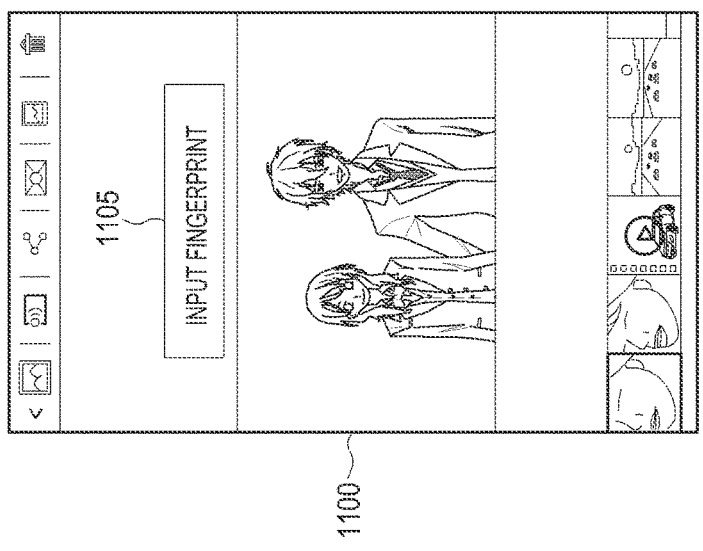

FIGS. 11A, 11B, and 11C illustrate a screen illustrating an object security operation according to an embodiment of the present disclosure.

Referring to FIG. 11A, a case of displaying a notification message 1105 that instructs to input a fingerprint to lock an object 1100 displayed on a screen is illustrated.

Referring to FIG. 11B a case in which two or more pieces of fingerprint information 1110 and 1120 to be combined are input is illustrated. In the example of FIG. 11B, the two or more pieces of fingerprint information may be fingerprints of different fingers of an identical user or fingerprints of different users. Although FIG. 11B illustrates a case of directly registering a fingerprint, locking may be executed using one of fingerprint information registered in advance. In this example, whether a combination of two or more pieces of fingerprint information is stored in the biometric information DB 320 may be determined so that only a verified user may lock an object.

Accordingly, when fingerprint information is input in operation 1010, the electronic device 100 determines whether the input fingerprint information exists in a stored fingerprint information list in operation 1015. In operation 1010, when fingerprint information is not input, the electronic device may return to operation 1005. In operation 1015, when the input fingerprint information does not exist, it returns to operation 1005 and requests inputting fingerprint information again. In operation 1015, when the input fingerprint information exists, it is regarded that the user is verified and thus, the object is secured and stored together with the input fingerprint information in operation 1020. As another example, the object may be secured using fingerprint information registered by the verified user.

Referring to FIG. 11C, a case of displaying an object displayed in a preview form and objects 1125 and 1135 in a state of being locked is illustrated. In particular, the object 1135 is locked by a single fingerprint 1140 and the object 1125 locked by a plurality of fingerprints 1130 are illustrated. As described above, locking with a single fingerprint and locking with a plurality of fingerprints may be displayed to be different from each other using items 1130 and 1140.

In this example, when an object is set to be locked, an icon for indicating a state of the object being hidden may be displayed instead of a preview of the object. Here, a plurality of objects displayed on a screen according to an embodiment of the present disclosure includes at least one of short-cut icons for executing applications, widgets, icons that indicate documents in a predetermined file format, pictures, and folders. Another example of the object includes contents obtained through a group purchase event, such as a movie, music, and the like.

For example, a plurality of persons have paid for the content, the corresponding persons need to come to an agreement on the playback schedule in order to play back the content obtained through a group purchase event. Therefore, when the agreement of the plurality of persons is needed, combined biometric information that is registered in advance may be used and thus, the reasonability of payment may increase and a great benefit may be offered to a service provider. Biometric information is not transferable and not copyable and thus, all of the purchasers of the group purchase event need to gather to utilize the purchased pay content. Another example of locking an object includes a child-lock function. The child-lock function may be embodied to execute locking function by registering a fingerprint of a parent to prevent children from excessively using content, and to execute an unlocking function under the consent of the parent. Biometric information of a parent or guardian is stored in the biometric information authentication server 410 in advance and thus, the electronic device 100 may recognize whether currently input biometric information corresponds to a number of persons that satisfies a condition of allowing a child to use the content.

As illustrated in FIG. 11C, when an object is locked with a plurality of fingerprints, for example, a combination of fingerprints of different users, a function that executes unlocking only when permissions of two corresponding users exist at the same time may be operated. For example, when fingerprints of two persons are stored half-and-half for an item associated with the memory of the two persons such as a predetermined picture, anniversary or the like, the item is unlocked only when two persons gather and thus, an effect of sentimentality may be provided.

FIGS. 12A, 12B, and 12C illustrate a screen illustrating an object security operation for a plurality of objects according to an embodiment of the present disclosure.

Referring to FIGS. 12A, 12B and 12C a screen illustrating a security operation for a plurality of objects according to an embodiment of the present disclosure is presented. In a state in which a plurality of objects are displayed, when two objects 1200 and 1210 are simultaneously touched as illustrated in FIG. 12A. The two finger are in contact with a surface 1220, where a fingerprint sensor is disposed so as to input a plurality of pieces of biometric information, that is, two fingerprints, as illustrated in FIG. 12B. The two objects 1200 and 1210 are locked with a plurality of pieces of biometric information 1230 and 1240 as illustrated in FIG. 12C.

Figure 13:
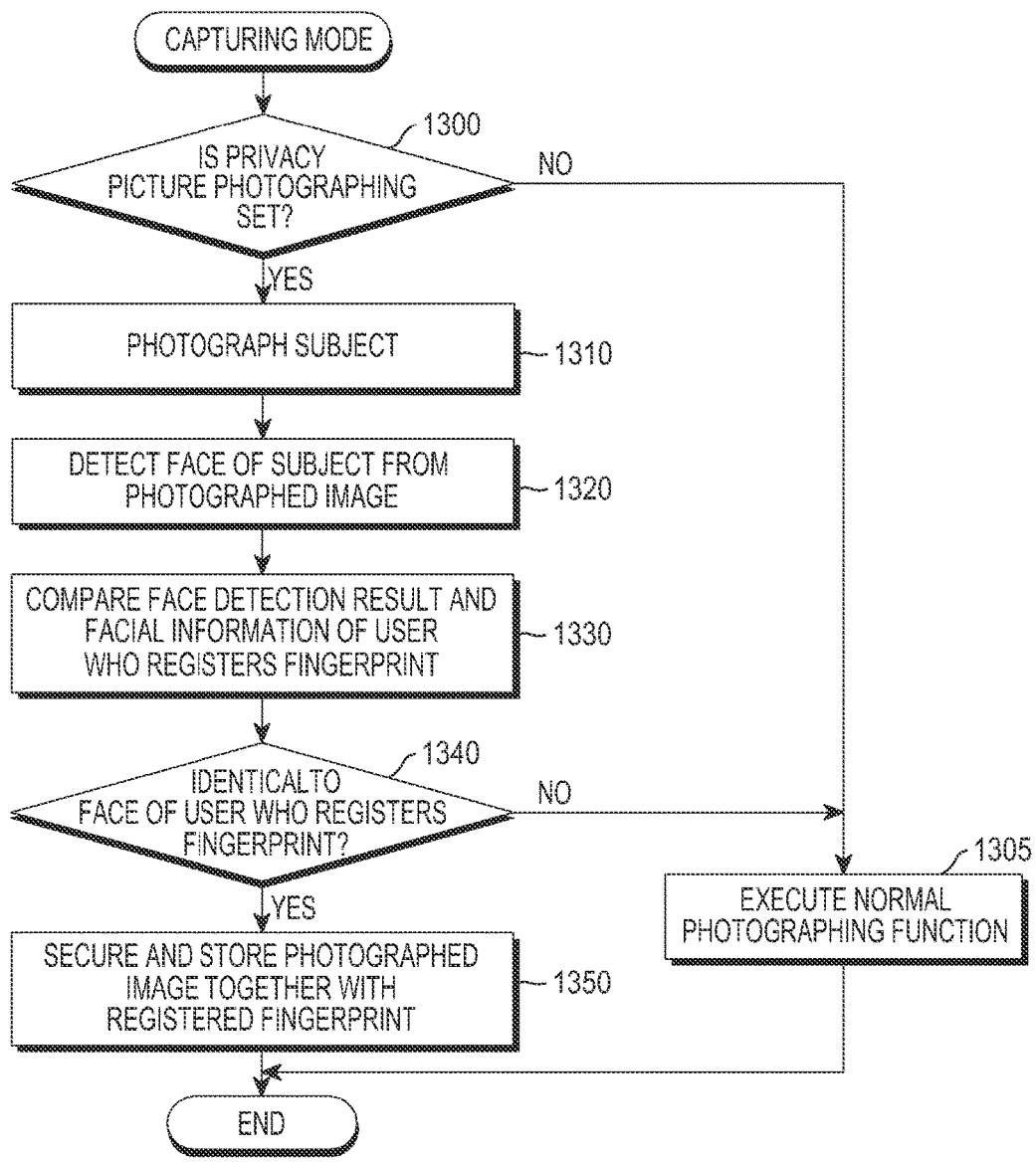
FIG. 13 is a flowchart illustrating an object security operation using fingerprint information in a security capturing mode according to an embodiment of the present disclosure.

FIG. 13 is a flowchart illustrating an object security operation using fingerprint information in a security photographing mode according to an embodiment of the present disclosure. FIG. 13 illustrates a process in which an image that is photographed in a security mode is automatically stored as a security image.

Referring to FIG. 13, the electronic device 100 may determine whether privacy picture photographing is set in operation 130. That is, whether a security mode is set is determined. When privacy picture photographing is not set, a normal photographing function is executed in operation 1305. In operation 1300, when the privacy picture photographing is set, a subject is photographed in operation 1310, and a face of the subject is detected from the photographed image in operation 1320. The electronic device 100 may compare a face detection result and facial information of a user who registers a fingerprint in operation 1330.

In operation 1340, whether the face detection result is identical to the face of the user who registers the fingerprint is determined. When the face detection result is identical to the face of the user who registers the fingerprint, the photographed image is secured and stored together with the fingerprint registered in advance in operation 1350. In this example, the previously registered fingerprint that is stored together with the photographed image is a fingerprint registered by the user, and may be single fingerprint information or a combination of two or more pieces of fingerprint information. In operation 1340, when the face detection result does not match the face of the user who registers the fingerprint, proceed to operation 1305. As described above, an object generated in a security mode is automatically locked with fingerprint information registered in advance and is stored and thus, a burden of separately selecting an object to be secured for locking may be reduced.

Figure 14:
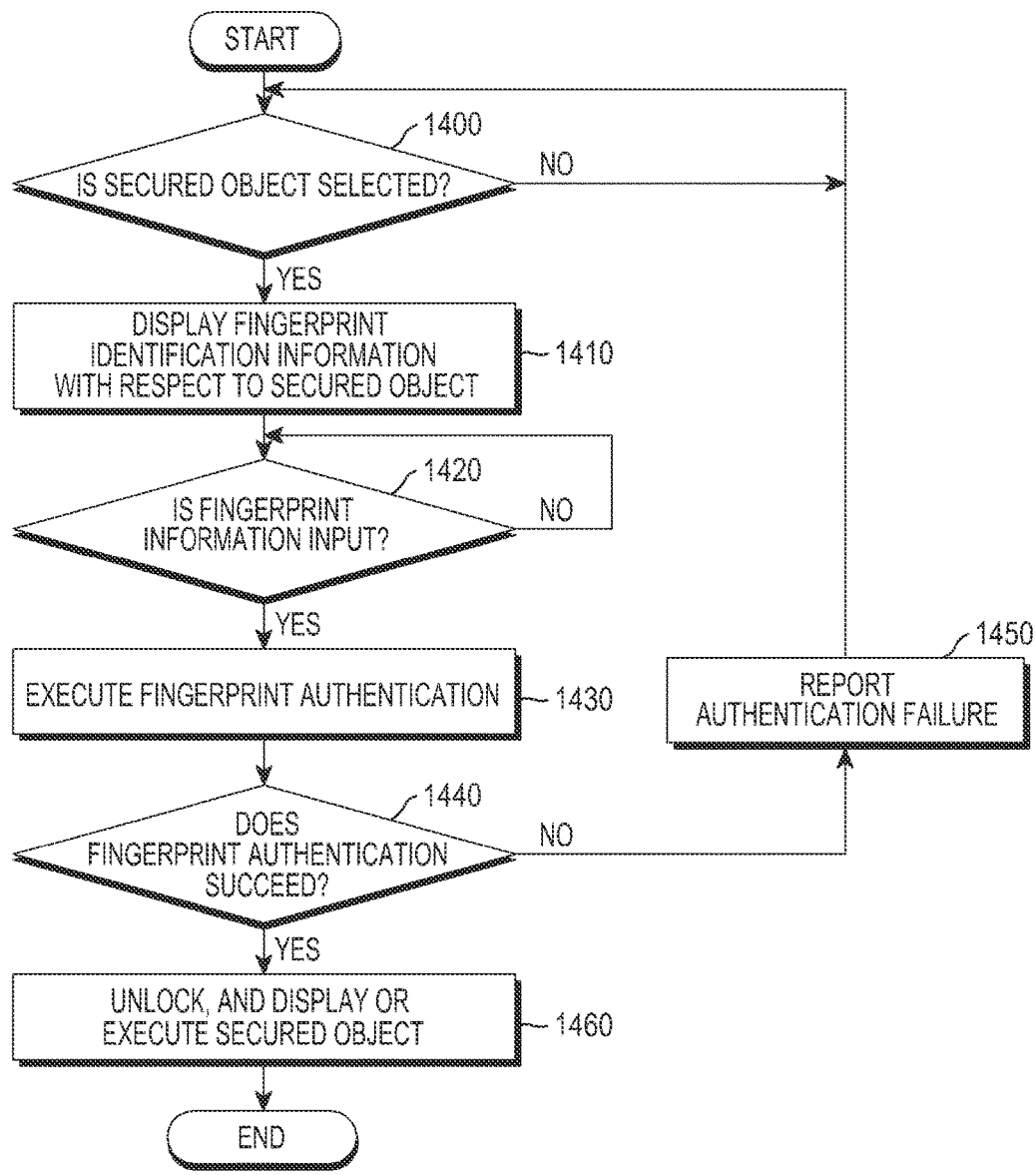
FIG. 14 is a flowchart illustrating an operation of accessing a locked object as fingerprint information is input according to an embodiment of the present disclosure.

FIG. 14 is a flowchart illustrating an operation of accessing a locked object as fingerprint information is input according to an embodiment of the present disclosure.

Figures 15A, 15B:
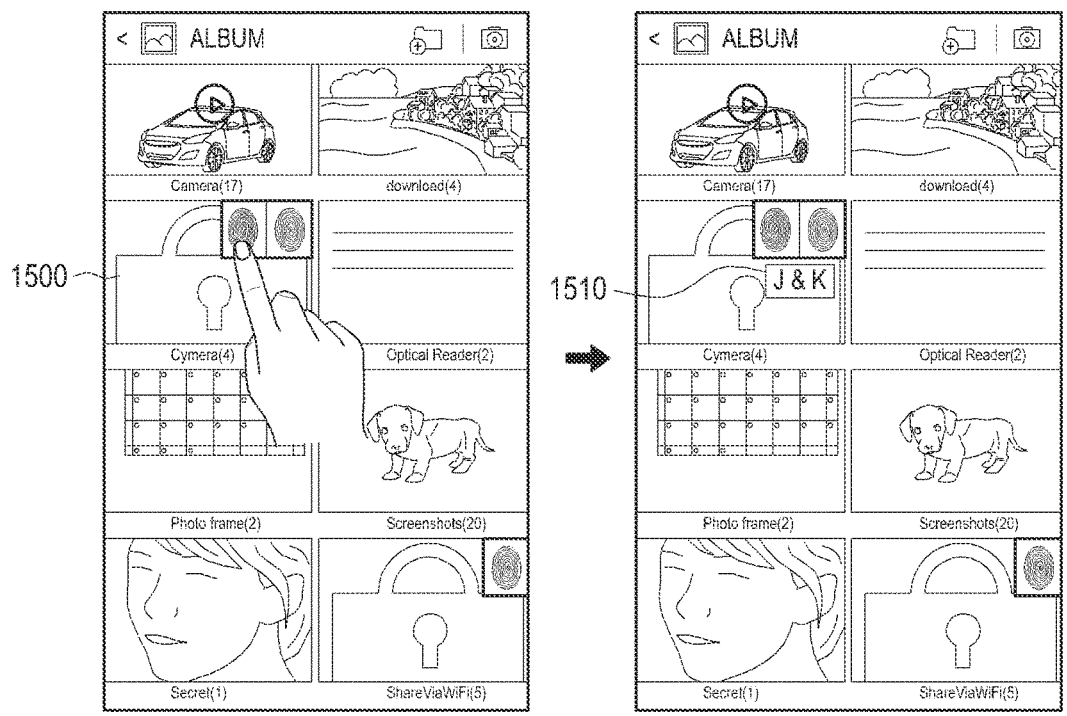
FIGS. 15A and 15B illustrate a screen that instructs inputting fingerprint information with respect to a selected object according to an embodiment of the present disclosure.

FIGS. 15A and 15B illustrate a screen that instructs inputting fingerprint information with respect to a selected object according to an embodiment of the present disclosure.

Referring to FIGS. 14, 15A and 15B, the electronic device 100 may determine whether a selection on a secured object 1500 exists in operation 1400 in a state in which a plurality of objects are displayed together with locked objects 1500 as illustrated in FIG. 15A. That is, the electronic device 100 may determine whether an input for unlocking a locked object exists. When the selection on the secured object 1500 exists, the electronic device 100 may display fingerprint identification information 1510 with respect to the secured object in operation 1410. The fingerprint identification information indicates fingerprint information used for locking an object, and displays whose fingerprint is used for encryption.

The electronic device 100 may execute fingerprint authentication in operation 1430 when fingerprint information is input in operation 1420. When it is determined that fingerprint authentication succeeds in operation 1440, the secured object is unlocked and the content of the object is displayed or executed in operation 1460. In operation 1440, when it is determined that the fingerprint authentication has failed, authentication failure is reported in operation 1450. As described above, according to an embodiment of the present disclosure, a method of displaying fingerprint identification information so as to inform of whose fingerprint is used for encryption is provided and thus, a user may readily execute decryption.

Figure 16:
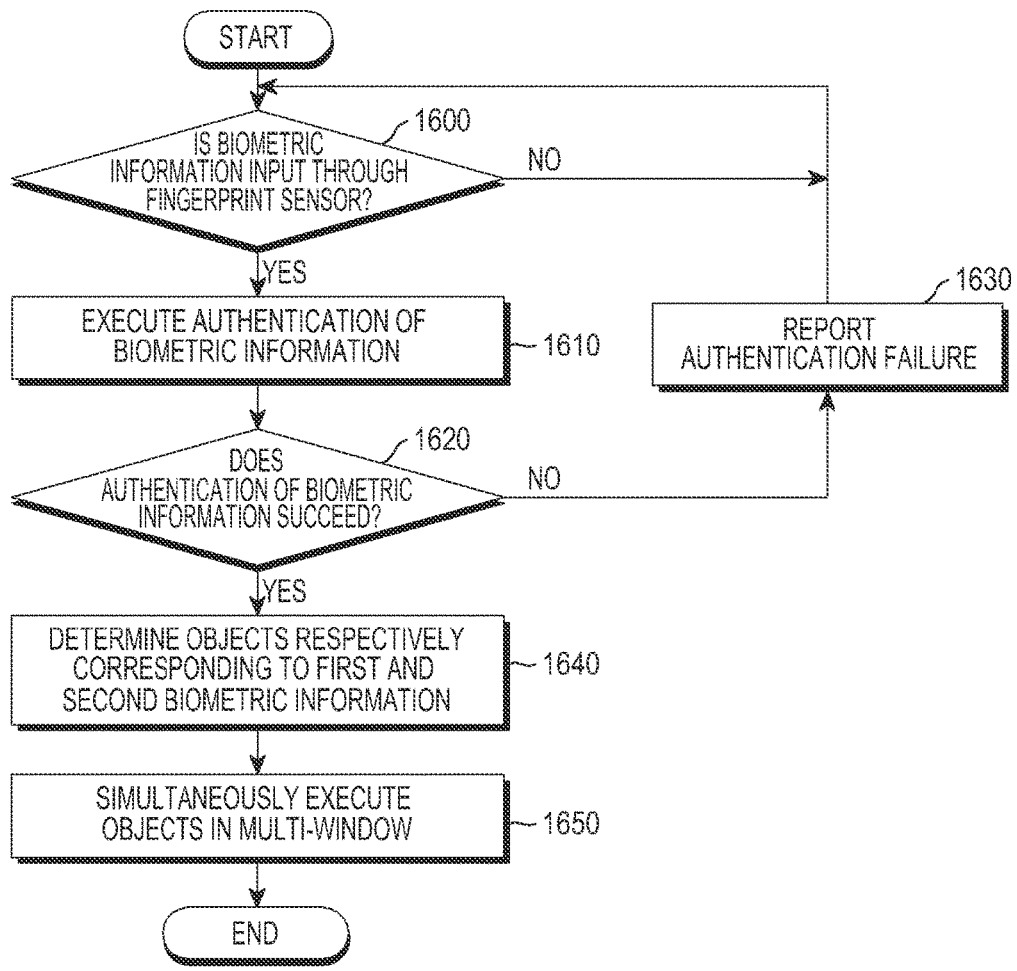
FIG. 16 is a flowchart illustrating an operation of executing a plurality of objects using a plurality of pieces of biometric information according to an embodiment of the present disclosure.

FIG. 16 is a flowchart illustrating an operation of executing a plurality of objects using a plurality of pieces of biometric information according to an embodiment of the present disclosure. FIG. 16 presumes a case in which different application execution commands are mapped to a fingerprint and a knuckle, respectively.

Figure 17A:
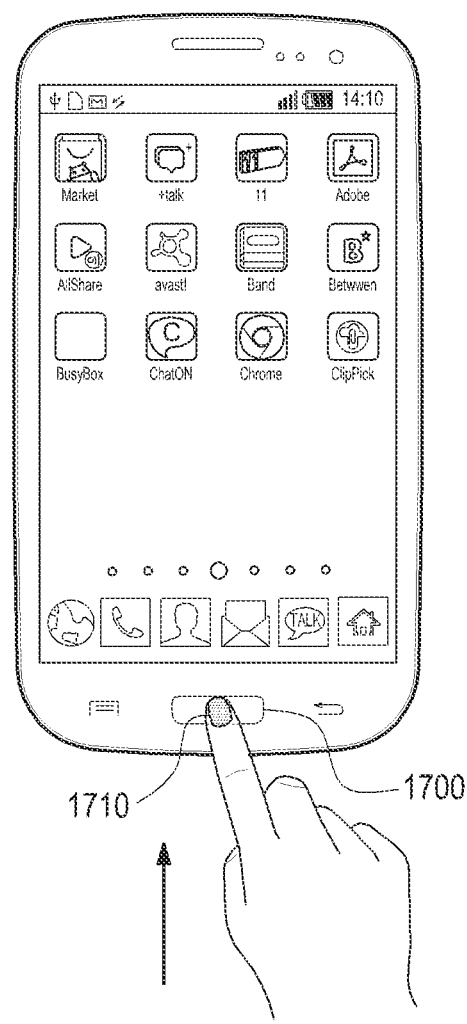
FIGS. 17A, 17B, and 17C illustrate screens associated with execution of a plurality of objects using a plurality of pieces of biometric information according to an embodiment of the present disclosure.
Figure 17B:
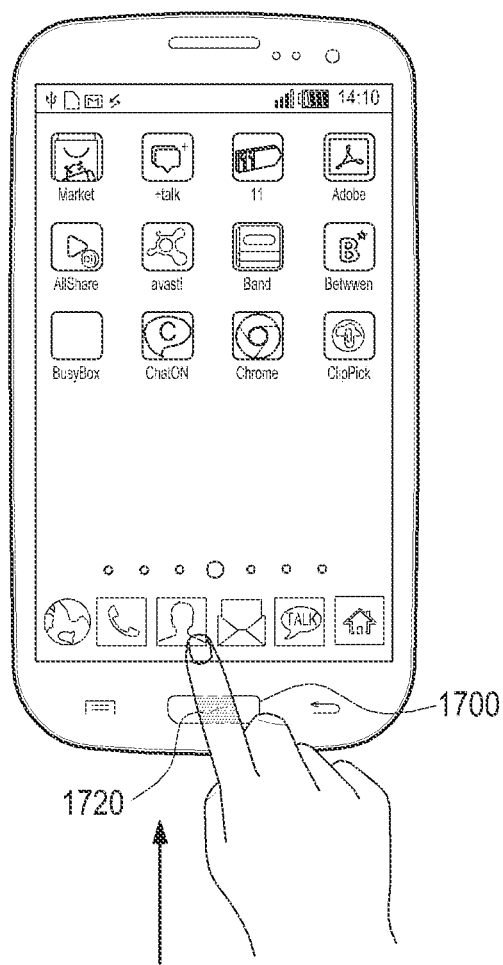
Figure 17C:
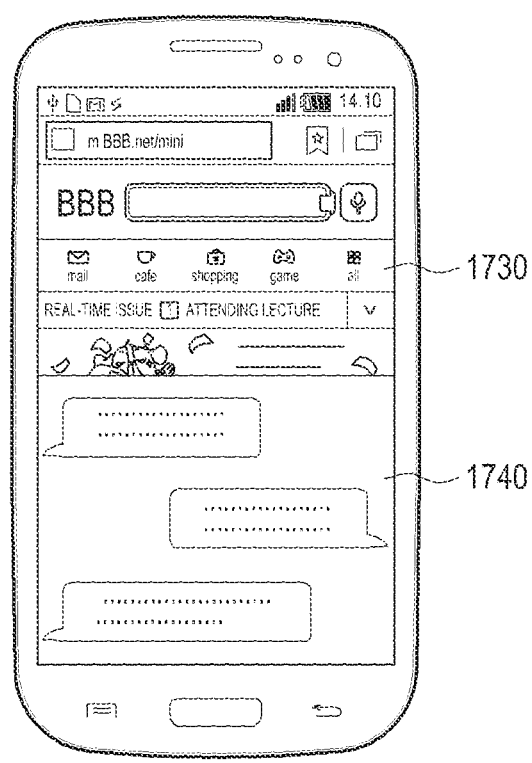

FIGS. 17A, 17B, and 17C illustrate screens associated with execution of a plurality of objects using a plurality of pieces of biometric information according to an embodiment of the present disclosure.

Referring to FIG. 16, the electronic device 100 may determine whether biometric information is input through a fingerprint sensor in operation 1600.

Referring to FIG. 17A illustrates a case in which a finger 1710 of a user is in contact with a fingerprint recognition area 1700, and when a swiping operation is performed that puts a finger into contact with the fingerprint recognition area 1700 and sweeps with the finger, a knuckle 1720 may be in contact with the fingerprint recognition area 1700 as illustrated in FIG. 17B. Accordingly, a plurality of pieces of biometric information such as the fingerprint, the knuckle, or the like, may be input through a fingerprint sensor.

Therefore, when the plurality of pieces of biometric information are input, the electronic device 100 may execute the biometric information authentication in operation 1610. That is, whether information associated with the fingerprint and knuckle is stored in the biometric information DB 320 is determined. When the biometric information authentication succeeds in operation 1620, the electronic device 100 may proceed to operation 1640. When the authentication fails, authentication failure may be reported in operation 1630.

As the biometric information authentication succeeds, objects respectively corresponding to first biometric information and second biometric information are determined in operation 1640, and the objects 1730 and 1740 may be simultaneously executed in a multi-window form as illustrated in FIG. 17C in operation 1650. FIG. 17C illustrates a multi-window screen associated with execution of a plurality of objects using a plurality of pieces of biometric information according to an embodiment of the present disclosure.

According to an embodiment of the present disclosure, there may be provided a security method that secures security and convenience using complex biometric information, and an electronic device that embodies the method.

Also, according to an embodiment of the present disclosure, more strengthened security is provided to various objects in an electronic device using complex biometric information combined of two or more pieces of biometric information.

Also, according to an embodiment of the present disclosure, authentication and execution of an object are simultaneously executed using complex biometric information and thus, convenience in using an electronic device may be increased.

It may be appreciated that the embodiments of the present disclosure may be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It is appreciated that the storage unit included in the electronic device is one example of a program including commands for implementing various embodiments of the present disclosure or a machine-readable storage medium suitable for storing programs. Therefore, embodiments of the present disclosure provide a program including codes for implementing a system or method claimed in any claim of the accompanying claims and a machine-readable device for storing such a program.

A program providing device may include a memory storing a program including instructions to instruct execution of a method of providing security using the complex biometric information, a communication unit to perform wired or wireless communication with an electronic device, and a controller to transmit a corresponding program to the electronic device, automatically or in response to a request from the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for providing security using complex biometric information, the electronic device comprising:
   a sensor;
   a memory; and
   at least one processor configured to:
   generate biometric combination information of a first type by combining two or more pieces of biometric information of the first type,
   store in the memory the generated biometric combination information, and
   execute a command corresponding to the generated biometric combination information if at least one biometric information sensed through the sensor corresponding to the generated biometric combination information is input.

2. The electronic device of claim 1, wherein the pieces of biometric information include at least one of fingerprints of an identical user, wrinkles of a knuckle, wrinkles of a palm, finger blood vessel pattern information, biometric bloodstream information, an electrocardiogram, a pulse rate, and an oxygen saturation.

3. The electronic device of claim 1, wherein, if the first type corresponds to a fingerprint of the identical user, the biometric combination information is generated by combining partial areas of at least two of fingerprints of the identical user.

4. The electronic device of claim 1, wherein, when at least two of fingerprints as the first type of different users are sensed, the at least one processor is further configured to:
   extract feature points from an entire area of a fingerprint of each different user,
   separate the entire area of each fingerprint of the at least two of fingerprints into predetermined areas, and
   store the feature points for each area of the two or more fingerprints.

5. The electronic device of claim 4, wherein the at least one processor is further configured to:
   generate biometric combination information by combining partial areas of the two or more fingerprints of the different users, and
   store the biometric combination information.

6. The electronic device of claim 4, wherein, when the at least two of fingerprints of different users are scanned through the sensor, the at least one processor is further configured to authenticate the at least two fingerprints using the feature points stored for each area of the at least two fingerprints.

7. The electronic device of claim 1, wherein the sensor includes at least one of a fingerprint sensor, an infrared (IR) sensor, a piezoelectric sensor, a hall sensor, an electrocardiogram electrode part, and an optical sensor.

8. The electronic device of claim 1, further comprising:
   a display configured to display an object for which locking is set,
   wherein the at least one processor is configured to cancel a lock set for the object when a command corresponding to the biometric combination information is an unlocking command.

9. The electronic device of claim 8, wherein the object corresponds to one of a shortcut icon for executing an application, a widget, an icon indicating a document in a predetermined file format, a picture, and a folder.

10. The electronic device of claim 8, wherein the at least one processor is further configured to display, on the display, the object for which locking is set together with identification information associated with the two or more pieces of biometric information used for locking the object.

11. The electronic device of claim 1, wherein the at least one processor is further configured to:
   determine whether biometric combination information corresponding to the two or more pieces of biometric information exist from among the plurality of pieces of biometric combination information,
   search for a command corresponding to the biometric combination information stored in the memory when the biometric combination information corresponding to the two or more pieces of information exist, and
   execute the retrieved command.

12. The electronic device of claim 1, further comprising:
   a communication interface configured to:
      transmit the two or more pieces of biometric information to a server, and
      receive, from the server, authentication information that authenticates that the two or more pieces of biometric information are identical to one of a plurality of biometric combination information,
   wherein the at least one processor is further configured to:
      search for a command corresponding to the two or more pieces of biometric information when the authentication information is received, and
      execute the retrieved command.

13. A method of providing security using complex biometric information, the method comprising:
   generating biometric combination information of a first type by combining two or more pieces of biometric information of the first type;
   storing in the memory the generated biometric combination information; and
   executing a command corresponding to the generated biometric combination information if at least one biometric information sensed through the sensor corresponding to the generated biometric combination information is input.

14. The method of claim 13, further comprising:
   when a plurality of objects are displayed and one of the objects is selected, requesting an input of the two or more pieces of biometric information,
   wherein the object corresponds to one of a shortcut icon for executing an application, a widget, an icon indicating a document in a predetermined file format, a picture, and a folder.

15. The method of claim 13, wherein the executing of the command corresponding to the biometric combination information comprises:
   setting a lock with respect to the object.

16. The method of claim 13, wherein the pieces of biometric information include at least one of fingerprints of an identical user, wrinkles of a knuckle, wrinkles of a palm, finger blood vessel pattern information, biometric bloodstream information, an electrocardiogram, a pulse rate, and an oxygen saturation.

17. The method of claim 13, wherein, if the first type corresponds to a fingerprint of the identical user, the biometric combination information is generated by combining partial areas of at least two of fingerprints.

18. The method of claim 13, wherein, when at least two of fingerprints as the first type of different users are sensed, the method further comprises:
   extracting feature points from an entire area of a fingerprint of each different user;
   separating the entire area of each fingerprint of the at least two of fingerprints into predetermined areas; and
   storing the feature points for each area.

19. The method of claim 18, wherein the determining of whether biometric combination information corresponding to the sensed two or more pieces of biometric information exist comprises:
   authenticating the at least two pieces of fingerprints using the feature points stored for each area when the fingerprints of different users are scanned; and
   determining whether biometric combination information combined of the at least two authenticated fingerprints exist from among a plurality of pieces of biometric combination information stored in advance.

20. A non-transitory computer-readable storage medium storing instructions that, when executed, cause at least one processor to perform the method of claim 13.

* * * * *